United States Patent
Dissmeyer et al.

[15] 3,650,418
[45] Mar. 21, 1972

[54] BOTTOM UNLOADER WITH OVERRUNNING CLUTCH

[72] Inventors: Fred W. Dissmeyer, Elgin; George E. Olson, Arlington Heights, both of Ill.

[73] Assignee: A. O. Smith Harvestore Products, Inc., Arlington Heights, Ill.

[22] Filed: Nov. 9, 1970

[21] Appl. No.: 87,878

[52] U.S. Cl. ....................................214/17 DA
[51] Int. Cl. ..........................................B65g 65/42
[58] Field of Search ...............................214/17 DA

[56] References Cited

UNITED STATES PATENTS

| | | | |
|---|---|---|---|
| 2,635,770 | 4/1953 | Tiedemann | 214/17 DA |
| 3,313,428 | 4/1967 | Schaefer | 214/17 DA |

Primary Examiner—Robert G. Sheridan
Attorney—Andrus, Sceales, Starke & Sawall

[57] ABSTRACT

A bottom unloading mechanism operating on the floor of a silo includes a cutter arm which is journaled on a central post at the center of the silo for rotation over the floor of the silo. The cutter arm has an endless cutter chain that dislodges the stored material and moves it toward the center of the silo where it is delivered to a discharge conveyor unit disposed in a radially extending trough in the silo floor. The cutter chain is driven by the conveyor unit when operating in one direction only and for that purpose a transmission in the central post includes a driven sprocket powered by the conveyor unit and transferring rotation in one direction to a second drive sprocket for the cutter chain by means of an overrunning clutch mechanism.

4 Claims, 5 Drawing Figures

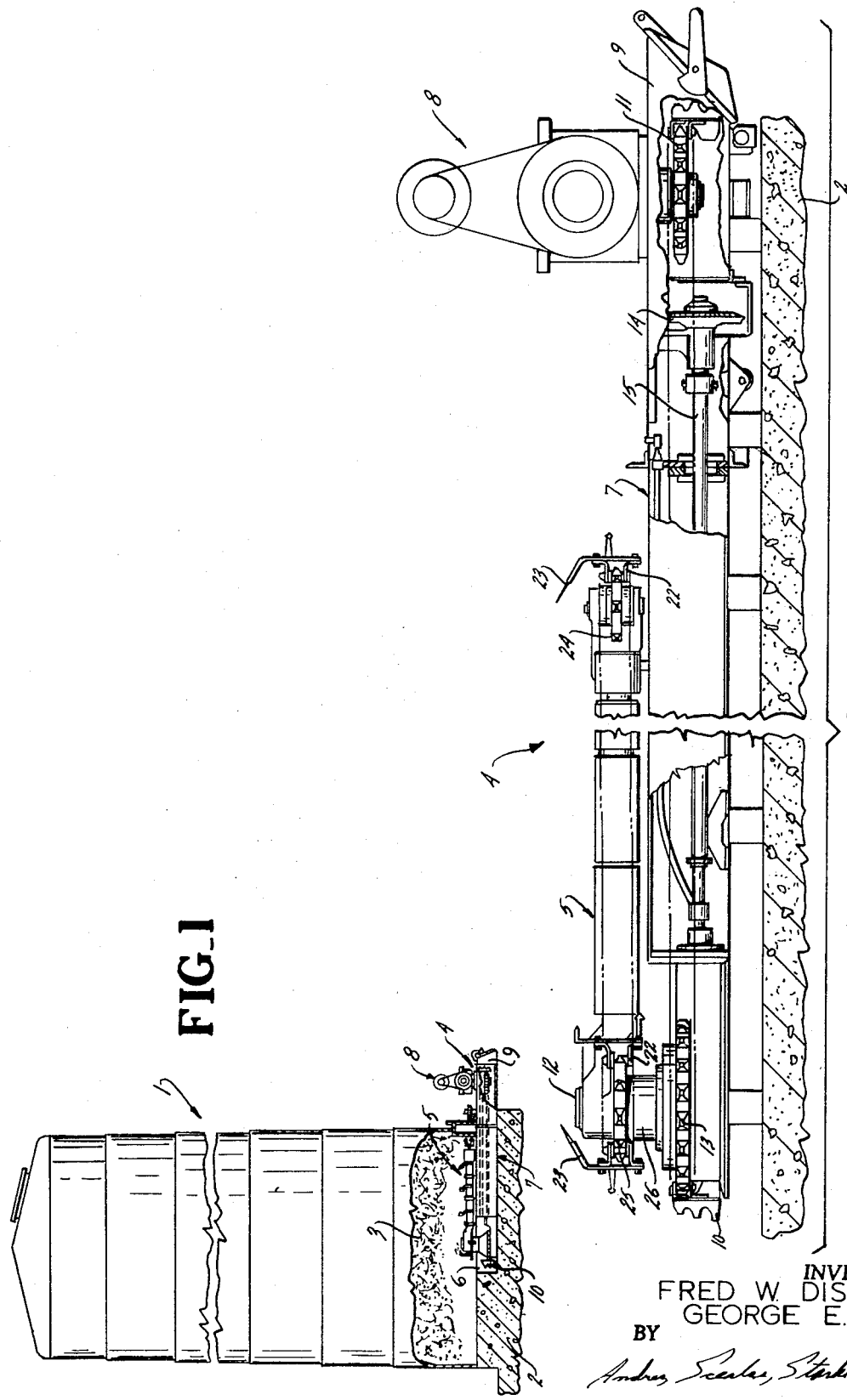

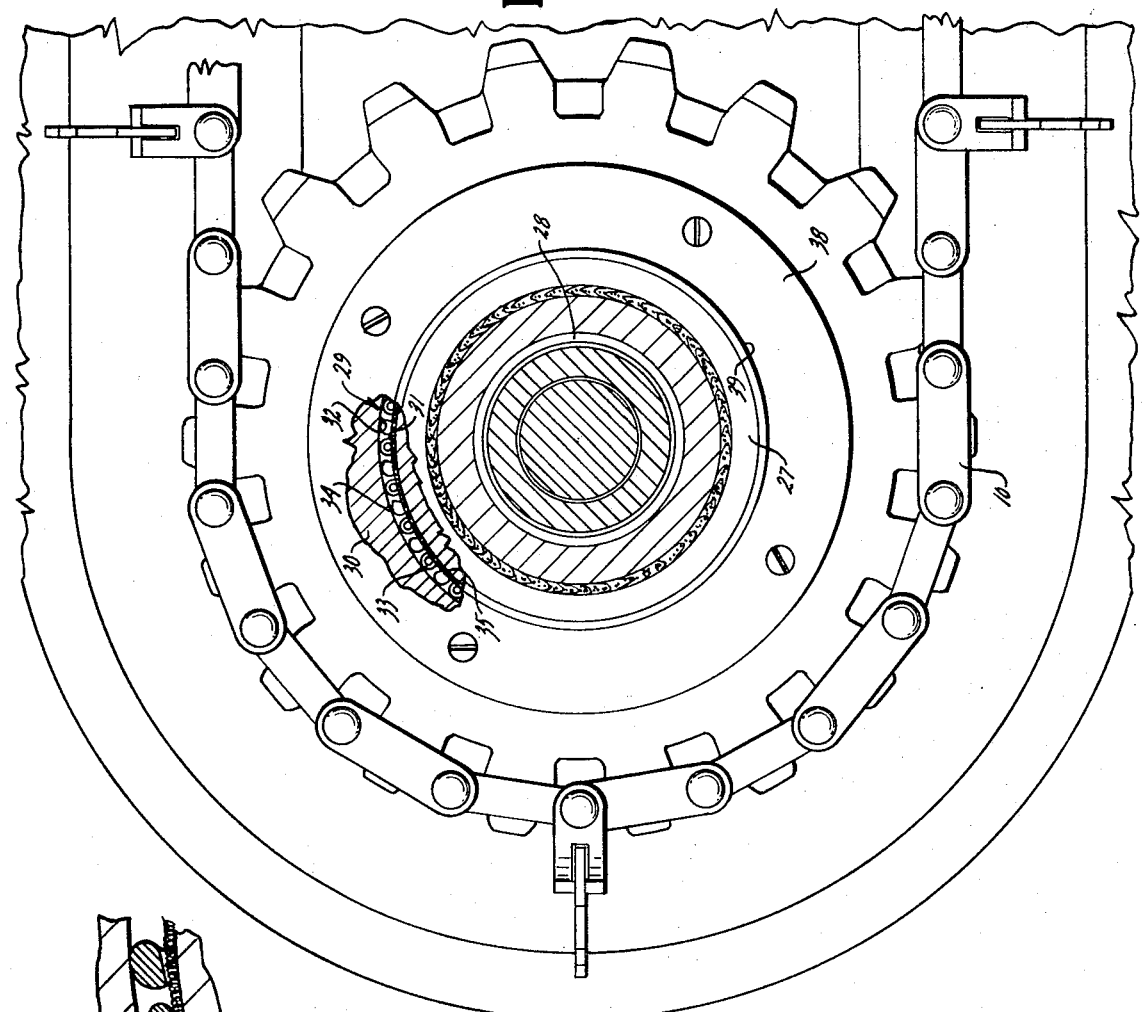
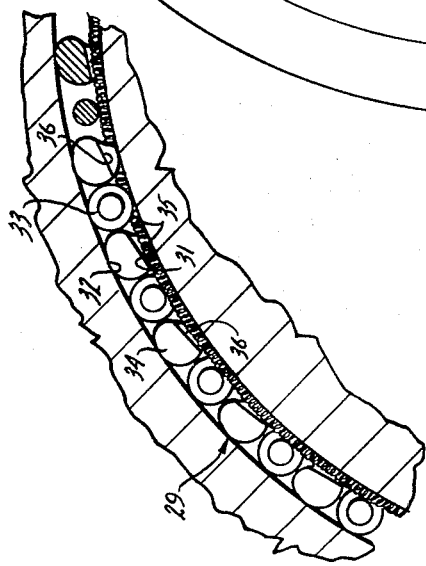

BOTTOM UNLOADER WITH OVERRUNNING CLUTCH

FIELD OF THE INVENTION

This invention relates to an apparatus for unloading a stored material from a storage structure such as a silo and more particularly to a clutch mechanism for an unloading apparatus.

BACKGROUND OF THE INVENTION

Storage structures such as silos can be unloaded by a bottom unloader which is located on the floor of the silo and undercuts the stored material to convey it to the exterior. An unloader of this type is disclosed in the U.S. Pat., No. 2,635,770, to Tiedemann and generally includes a cutter arm which is journaled for rotation about a center post or shaft at the center of the foundation or floor of the silo and rotates within the silo beneath the stored material. The cutter arm carries a cutting mechanism such as an endless cutter chain that dislodges silage or other stored material and moves it to the center of the silo where it is delivered to the inner end of a radially extending trough formed in the foundation of the silo. A conveyor unit operates within the trough and conveys the dislodged material to the exterior of the silo.

In the conventional bottom unloader, the cutting mechanism and the conveyor unit both include endless chains, each of which travels over a corresponding central sprocket journaled around the center post in the silo. The conveyor chain is driven by a drive located exteriorly of the silo, and rotation of the central driven sprocket of the conveyor unit is transmitted to the second driven sprocket for the cutter chain to operate the cutter chain.

In some situations, it is desired to operate the conveyor unit without driving the cutter chain. One means of providing this feature is disclosed in U.S. Pat. No. 3,313,428 to Schaefer. This patent shows the cutter arm chain carried by a sprocket which is mounted on an upper sprocket hub journaled on the central post. A conveyor chain for the conveyor unit is driven at the outer end and is carried at the inner end by a sprocket mounted on a lower sprocket hub that is also journaled on the central post. By an assembly of mating gear rings between the upper and lower sprocket hubs, the cutter chain sprocket can be selectively disengaged from the sprocket for the conveyor unit so that only the conveyor unit will operate.

Operation of the clutch in the Schaefer patent requires the actuation of a linkage extending from the exterior of the structure to a clutch inside the structure.

SUMMARY OF THE INVENTION

The invention is directed to a bottom unloader for a storage structure which has a cutter mechanism on a sweeping cutter arm that operates in accordance with the direction of operation of a discharge conveyor unit which is fed by the cutter arm. The cutter mechanism is driven by the discharge conveyor unit through the means of the invention, and may be conveniently disengaged from the discharge conveyor unit simply by reversing the direction of rotation of the discharge conveyor.

To provide this feature, the discharge conveyor drives a first rotating means or hub journaled on the post shaft located at the center of the storage structure floor. The first hub transmits rotation by means of an overrunning clutch to a similarly mounted second rotating means or hub for the cutter mechanism. The overrunning clutch causes the second hub to be driven in one direction and to be disengaged in the opposite direction of rotation of the conveyor driven hub.

The invention is particularly advantageous in unloading free flowing and semifree flowing stored materials. The cutter mechanism may be simply disengaged at times to permit the discharge conveyor to unload the free flowing material, thus reducing power requirements, reducing wear on the cutting mechanism, and reducing degradation of the stored material during unloading. Particularly advantageous is the elimination of additional structure to actuate a clutch which permits such advantageous operation.

DRAWINGS

The drawings furnished herewith illustrate the best modes contemplated by the inventors for carrying out the practice of the invention.

In the drawings:

FIG. 1 is a side elevational view of a silo with portions broken away to show the apparatus of the invention incorporated therein;

FIG. 2 is a side elevational view of the bottom unloader of the invention with parts broken away;

FIG. 4 is an enlarged fragmentary view taken generally along lines 4—4 of FIG. 3, with parts cut away; and FIG. 5 is an enlarged fragmentary view of a portion of FIG. 4 showing the overrunning clutch structure with parts in section.

DESCRIPTION

Figure 3:
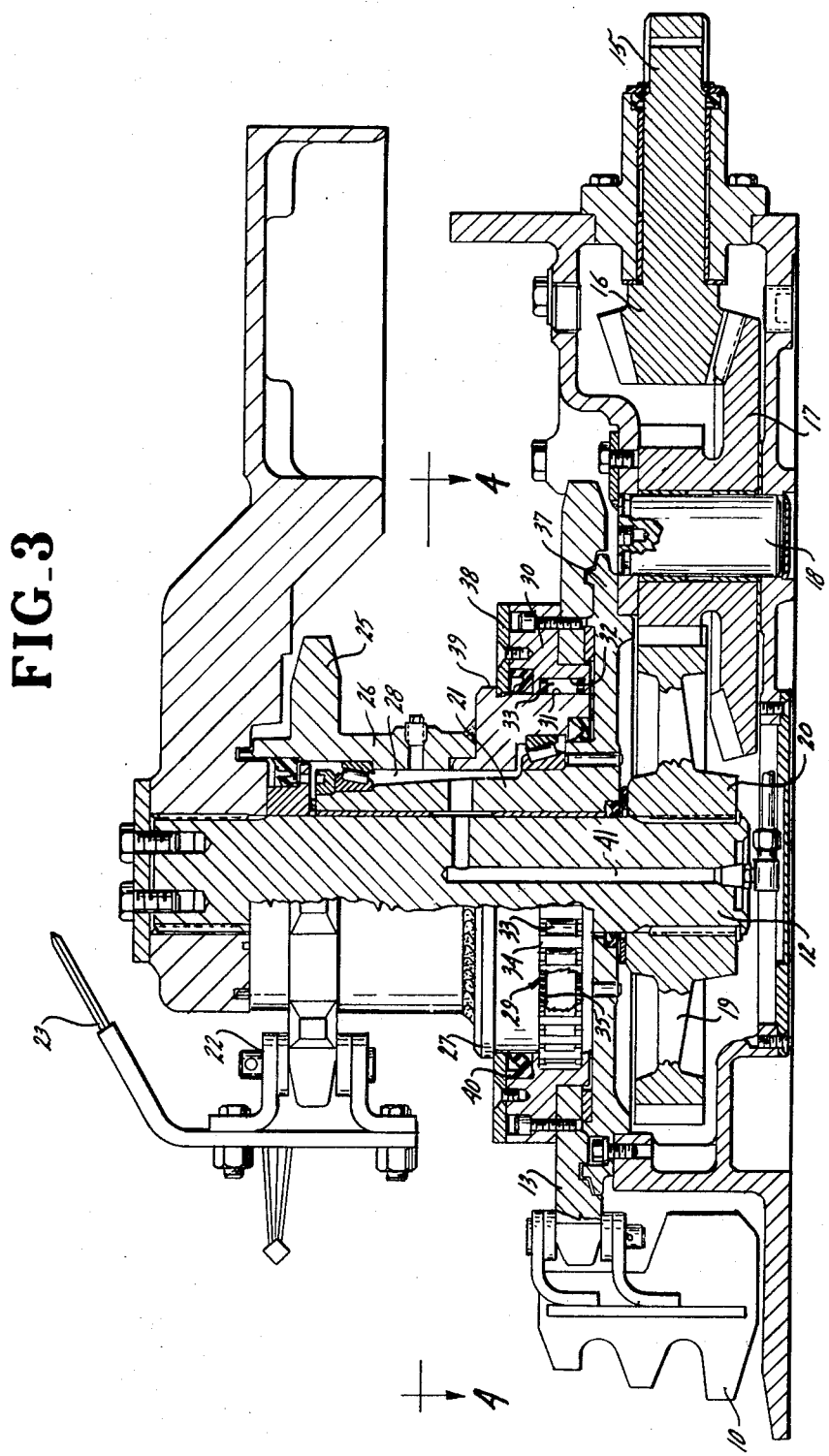
FIG. 3 is an enlarged side elevational view of a portion of the structure shown in FIG. 2, with parts in section.

The drawings illustrate a storage structure or silo 1 which is supported on a foundation 2 and contains a stored material 3, such as grain, corn silage, grass silage, shelled corn, chopped ear corn, soy meal, sugar, flour, or the like. Material 3 is conventionally loaded through a suitable opening in the top of silo 1 and is removed by a bottom unloader 4 that operates beneath the material.

Unloader 4 includes a cutter arm 5 rotatably mounted at the center of foundation 2. Arm 5 rotates over the foundation to cut or dislodge a portion of material 3 and deliver the portion to an opening at the center of the foundation. From the center opening a radially extending trough 6 is formed in foundation 2 and a discharge conveyor unit 7 operates in the trough and conveys to the exterior the material delivered by cutter arm 5.

The rotating cutter arm 5 and discharge conveyor unit 7 are driven by a reversible drive unit 8 secured to a portion of a conveyor housing 9 at the exterior of silo 1. Conveyor unit 7 may be of a construction such as that shown in Tiedemann U.S. Pat. No. 2,635,770, referred to previously, and has an endless chain member 10 that engages a drive sprocket 11 of drive unit 8. At the center of foundation 2, a center post 12 extends upward from trough 6. Endless chain 10 extends through trough 6 and around post 12 on a sprocket 13 journaled for rotation about post 12.

To drive cutter arm 5 around foundation 2, drive unit 8 powers a driven gear 14 within conveyor unit housing 9 beneath unit 8, as shown in the above-mentioned U.S. Pat. No. 2,635,770. Gear 14 is vertically disposed and is suitably attached to rotate a power shaft 15 that extends within the confines of housing 9 through trough 6 to the area of center post 12. As best shown in FIG. 3, shaft 15 carries at its inner end a bevel gear 16 which engages a horizontal bevel gear 17 mounted for rotation on a post 18 secured to the bottom of housing 9. Horizontal gear 17 drives a central bevel gear 19 also horizontally positioned and having a hub 20 keyed to center post 12 which is rotatable therewith. Arm 5 is secured as by bolts at the top of post 12 and is thus rotated by the power transmitted from shaft 15. The center post is located for rotation within a sleeve 21 which is secured to frame portions of housing 9.

The silage is dislodged and moved toward the center of silo 1 by a cutter mechanism means which may be a cutter chain 22 of the type shown in Tiedemann, U.S. Pat. No. 2,635,770. Referring to FIGS. 2 and 3, chain 22 is an endless member extending around the frame of arm 5 and carrying cutting and conveying blades 23. At the outer end of arm 5, chain 22 is trained over a sprocket 24, and at the inner end is driven and supported by a cutter arm sprocket 25 which is integral with an upper sprocket hub 26 that is journaled by suitable bearings to rotate around sleeve 21 and center post 12. Portions of the stored material are dislodged by blades 23 which also convey the portions to the center of the silo floor with the movement of chain 22, so that material falls into the central portion of trough 6.

A lower sprocket hub 27 is located beneath upper sprocket hub 26 and is journaled on sleeve 21 by suitable bearings. Hubs 26 and 27 are welded together and have a space 28 for lubricant between their inner surfaces and the outer diameter of sleeve 21. In accordance with the invention, lower hub 27 is driven in one direction by sprocket 13 which is rotated by the discharge conveyor chain 10. This selective power transmission is provided by an overrunning clutch mechanism 29 between hub 27 and a cooperating outer hub 30 which is secured as by bolts to sprocket 13.

Overrunning clutch 29 may be of any suitable type such as the cam and roller type shown in FIGS. 3-5. In this example, the clutch includes an inner race 31 circumferentially disposed around the outer diameter of a hub 27 and an outer race 32 formed in the inside diameter of hub 30. Outer race 32 is an annular recess in hub 30 and confines a series of rollers 33 alternating with cams 34 around the annulus. A pair of annular springs 35 are disposed on the upper and lower edges of race 32 and are tensioned to provide a force radially outward from inner race 31. Coil springs are shown in the drawings for this purpose, although other types such as sheet metal rings could be used. Springs 35 are engaged against upper and lower edges 36 on the inside face of cams 34 and against reduced diameter portions of rollers 32. Rollers 32 serve as bearings, while cams 34 are shaped to lock against inner race 31 in one direction of rotation and to disengage under the influence of springs 35 in the opposite direction. Thus, power from conveyor chain 10 and drive unit 8 is transmitted to hub 27 and sprocket 25 to rotate cutter chain 25 only in one direction, and is inoperative to drive chain 25 in the opposite direction.

Further details of construction shown in the drawings are an annular flange 37 on the bottom part of sleeve 21. Flange 37 and suitable bearings provide journaled support for center post 12, conveyor sprocket 13 and hubs 27 and 30. Flange 37 is, in turn, attached to housing 9 in trough 6. In addition, the top of hub 30 carries an annular bearing plate 38 which slidably engages an outer ledge 39 of lower hub 27 to further support hubs 26 and 27. A seal 40 is preferably included beneath plate 38 and hubs 27 and 30.

Lubrication may be provided for the various journaled members by any suitable means and a lubricant system is indicated generally by the numeral 41. System 41 extends from the exterior of silo 1 to the center where it includes a swingable portion within center post 12 and openings to the various spaces between journaled members. Lubricant is then supplied from the exterior under pressure to reach the vital parts in a commonly known manner.

OPERATION

A silo 1 containing material 3 is unloaded by starting drive unit 8 in a first direction, such that discharge conveyor 7, by means of overrunning clutch mechanism 29, rotates cutter chain 22 on cutter arm 5. Cutter arm 5 will at the same time rotate over the foundation 2 to dislodge and move portions of material 3 to trough 6 where conveyor 7 conveys the material for discharge exteriorly of the silo.

When flow of material 3 is started, many materials will tend to continue flowing relatively freely. When this happens, drive unit 8 may be reversed and cutter chain 22 is thus disengaged. Cutter arm 5 rotates in reverse, if desired, and conveyor 7 operates in reverse to continue discharge of the freely flowing material. If flow stops, drive unit 8 can be again operated in the first direction to further loosen the material until free flow results again.

The structure of the invention described may be thus conveniently operated to reduce power requirements, material degradation and wear on parts when free flow or semifree flow can be established. This is accomplished while avoiding complicated linkages and other structure for providing such operation.

Various modes of carrying out the invention are contemplated as being within the scope of the following claims particularly pointing out and distinctly claiming the subject matter which is regarded as the invention.

We claim:

1. A bottom unloader for a storage structure adapted to contain a stored material, the bottom unloader comprising:
   a reversible drive unit;
   a center post disposed centrally at the bottom of the storage structure;
   a discharge conveyor extending from the exterior of the storage structure to said center post and driven from the reversible drive unit to move a portion of the stored material from said center post to the exterior of the storage structure;
   a cutter arm journaled for rotation around said center post and connected to be driven by said drive unit to rotate around the bottom of the storage structure above the discharge conveyor;
   cutting means carried by said cutter arm for dislodging and moving portions of the stored material to said discharge conveyor; and
   clutch means operatively connected between said discharge conveyor and said cutting mechanism for driving said cutting means from said discharge conveyor when the drive unit is operating said conveyor in a first direction and for rendering said cutting means inoperative when said drive unit is reversed.

2. The unloader of claim 1, and including:
   a first rotatable means connecting said discharge conveyor at said center post for rotating as said conveyor is driven in forward and in reverse by said drive unit;
   a second rotatable means connecting with said cutting means at said post adjacent said first rotatable means for selectively driving said cutting mechanism from said first rotatable means; and
   said clutch means including an overrunning clutch disposed between said first and second rotatable means for rotating with said first rotatable means and engaging said second rotatable means to transmit rotation in a first direction of rotation and to disengage from said second rotatable means in the reverse direction.

3. The unloader of claim 1, wherein:
   said discharge conveyor has a first hub member journaled for rotation about said post, said discharge conveyor connected to drive said first hub; said cutting means has a second hub journaled for rotation around said post concentrically with said first hub; and
   said clutch means includes an overrunning clutch member interengaging said first and second hubs and selectively transmitting rotation from the second hub to the first in only one direction of rotation.

4. In a bottom unloader for a storage structure adapted to contain a stored material, the unloader including a reversible drive unit; a discharge conveyor having an endless chain assembly moving the drive unit from the center of the storage structure floor to the exterior of the storage structure, a center post on the floor at the center of the storage structure, a lower sprocket journaled on the post and around which the endless chain assembly is trained, a cutter arm journaled on the post above the discharge conveyor and adapted to rotate over the floor of the storage structure, an endless cutter chain carried by the cutter arm; an upper sprocket journaled on the post and over which the cutter chain is trained; a power transmission assembly comprising:
   an upper hub carrying the upper sprocket and journaled for rotation on the post;
   a lower hub carrying the lower sprocket and journaled for rotation on the post concentrically with a portion of the upper hub, thereby defining adjacent surfaces on said upper and lower hubs; and
   an overrunning clutch interengaging said adjacent surfaces on said upper and lower hubs, said clutch being continuously engaged with said lower hub and selectively engaging said upper hub to rotate said upper hub with said lower hub in one direction of rotation.